United States Patent [19]

Banoczi

[11] 4,066,557
[45] Jan. 3, 1978

[54] PAINT STRAINER

[76] Inventor: Joseph A. Banoczi, 82 West Ave., Darien, Conn. 06820

[21] Appl. No.: 288,894

[22] Filed: Sept. 14, 1972

[51] Int. Cl.$^2$ ............................................. B01D 35/28
[52] U.S. Cl. .................................................... 210/470
[58] Field of Search ........ 222/189, 565, 188, 567–571,
222/166, 465, 189; 239/590–590.5; 209/403,
405, 408; 210/233, 236, 515, 516, 518, DIG. 23

[56] References Cited
U.S. PATENT DOCUMENTS

| | | | |
|---|---|---|---|
| 282,093 | 7/1883 | Kribs | 210/238 X |
| 642,787 | 2/1900 | Eakin | 222/188 |
| 690,828 | 1/1902 | Brown | 222/189 X |
| 2,015,087 | 9/1935 | Rafton | 209/403 |
| 2,149,227 | 2/1939 | Olson et al. | 222/189 X |
| 2,527,531 | 10/1950 | Cates, Jr. | 210/359 X |
| 2,565,774 | 8/1951 | Mond | 222/189 X |
| 3,814,258 | 6/1974 | Ayres | 210/DIG. 23 X |
| 3,846,077 | 11/1974 | Ohringer | 210/DIG. 23 X |

Primary Examiner—Robert B. Reeves
Assistant Examiner—Norman L. Stack, Jr.

[57] ABSTRACT

The present invention provides a means for separating free flowing paint from lumps in the paint. Towards this end the embodiment of the present invention is a paint strainer screen preferably circular in configuration. The strainer in question, in its simplest form is manufactured from a circular disk of an ordinary wire screen, reinforced at its outer edge with a circular rim. The screen is somewhat smaller in diameter than the opening in the paint can so that it can be readily inserted into the can proper. By means of a stick the screen strainer is forced into the paint which prior to this has been thoroughly mixed with the stick. As the screen moves towards the bottom while being pushed by the stick, the free flowing paint passes through the wire mesh in the screen and collects above it, while the lumps in the paint collect on the bottom of the can under the screen.

2 Claims, 17 Drawing Figures

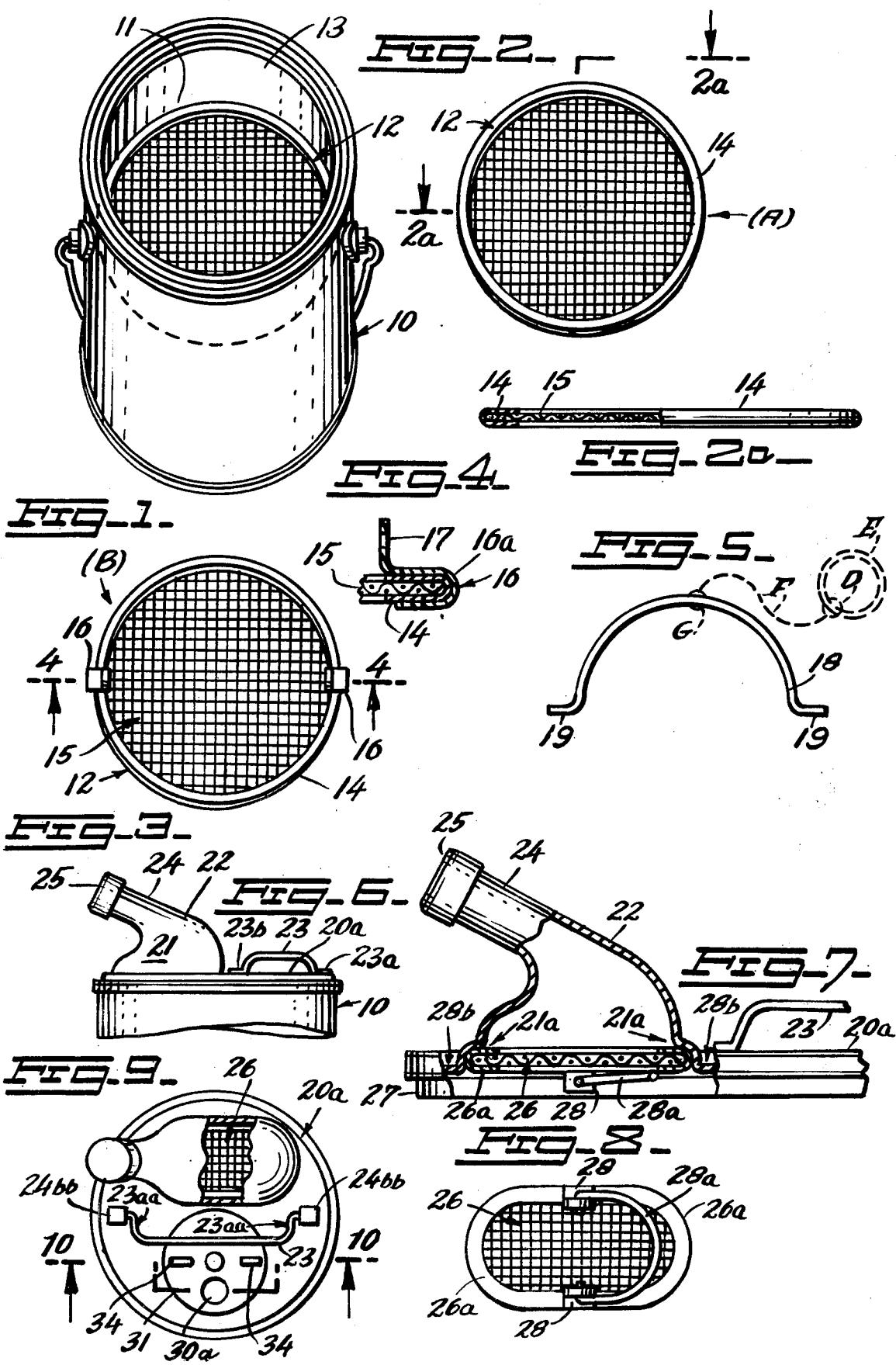

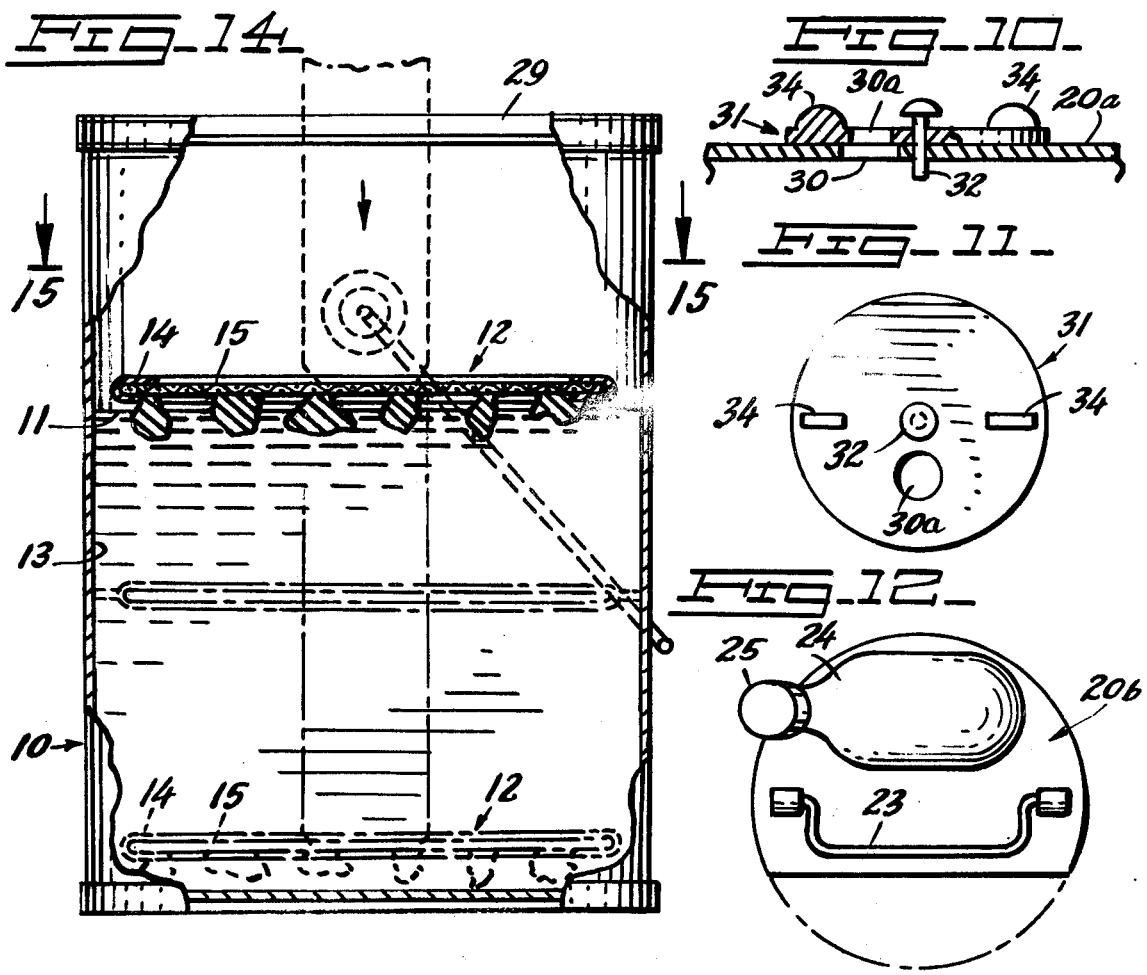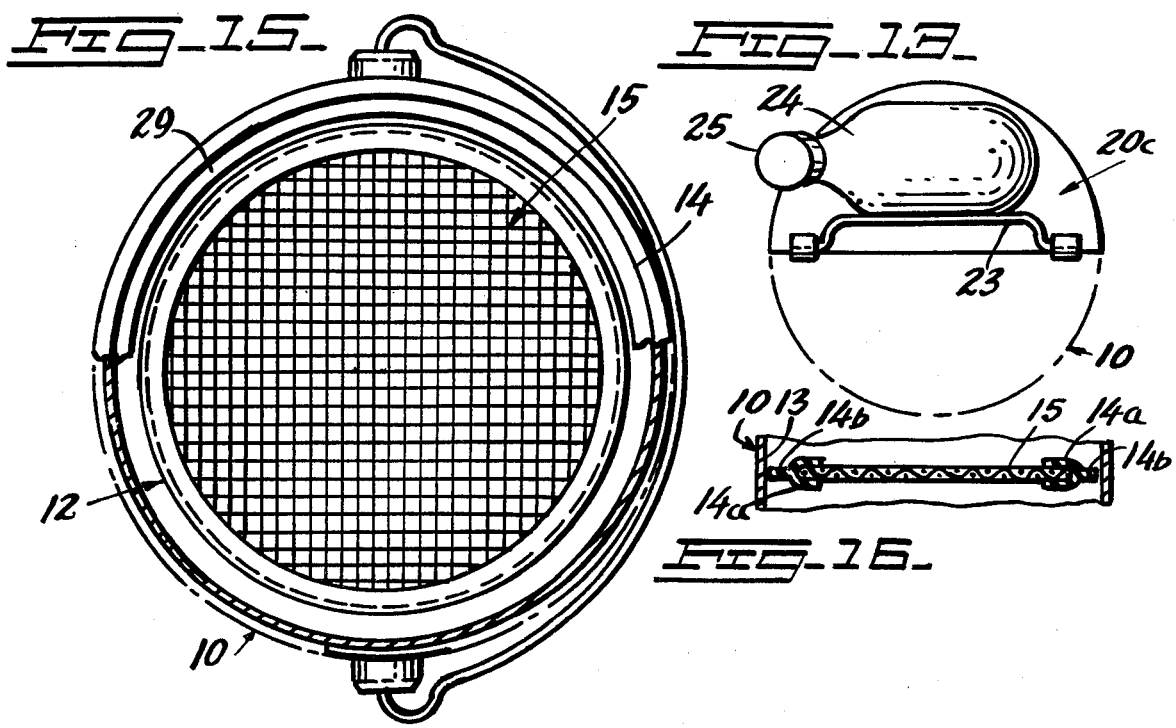

PAINT STRAINER

The present invention relates to paint strainers, and more particularlyit concerns itself with a a wire screen which when submerged into a partially full can on paint will force lumps in the paint down to the bottom of the can and away from physical contact with the paint brush.

The main object of the present invention is to provide a strainer, preferably of circular configuration, in the shape of a disk, which may be readily dropped into a paint can which contains used paint which has stood unused and has coagulated. After the paint has been thoroughly mixed by means of a stick, the strainer in the can can be pressed into the paint towards the bottom of the can. As the strainer under the pressure of the stick moves towards the bottom of the can it will take along with it all the lumps of paint to the bottom, while it will permit easy passage of the fluid paint through the openings in the wire screen. The free running paint thus will collect above the screen strainer ready for use by the brush or the paint roller.

A strainer forming an embodiment of the present invention, by its very nature, should be preferably fabricated from any suitable flexible screen material such as screen wire cloth, plastic screen, plastic extruded screen, or a plastic sheet with holes and perforations. The outer border of such a screen may be turned over invardly to form a circular edge, or a separate reinforcement may be secured to the edge of the screen and attached thereto, like a annular ring of U-shaped cross section. Such a screen may be of various diameter sizes to fit various sizes of paint cans. Obviously the outer diameter of a rigid screen must be slightly smaller than the opening in the can to permit easy insertion. Furthermore the screen strainer may be formed of pliable and flexible material for obvious reasons.

In practice, after the left-over paint has been mixed, the paint screen strainer may be used to help separate the smooth fluid paint from the coagulated lumps. When the paint in the can has been used, then the strainer may be discarded together with the empty paint can.

Another object of the present invention is to provide a paint strainer for easy and safe use. The strainer due to its low manufacturing cost will make an excellent giveaway or premium item advertising feature, the manufacturer can have his company's named printed or etched on it. The paint dealer also can have his name and address printed on it. The screen strainer if necessary can be cleaned with a paint cleaner and can be used over and over again for economy.

Another object of the present invention is to provide a paint can with a funnel or a spout to help pour the paint from the can. Even in this case it will be desirable that lumps of paint do not mar the painted work. Accordingly, the spout may be provided with a screen to separate the lumps from the free flowing paint.

As there is a vacuum formed in the paint can when the paint is poured by the spout, near the spout the can cover may be provided with an air vent opening. A small plate or disk rotating on a pin can be provided to cover the vent hole when not in use.

Furthermore, the paint cover may be provided with a cover which is somewhat smaller that the full cover; (e.g., a three-quarter or half cover). This design will eliminate the need for the vent hole and the vent cover.

The primary need to provide the can cover with a spout is to make sure that the paint is poured without spillage. A cover which will permit accurate pour without spillage is very desirable. A paint strainer fitted in the cover under the spout and friction-held to permit easy removal is also desirable. Towards this end the strainer has a wire handle which may be hinged to swing out of the way when the screen is fitted under the spout, with the handle being moved out again to help remove the screen from the cover.

This invention also comprises certain other features of construction, and the combination and arrangement of several parts, to be hereinafter fully described, illustrated in the accompanying drawings, and specifically pointed out in the appended claims.

In describing the invention in detail, references will be had to the accompanying drawings where like character numerals denote like or corresponding parts throughout the several views, in which:

FIG. 1 is a perspective view showing an embodiment of the present invention;

FIG. 2 is a plan view in partial perspective of the screen strainer;

FIG. 2a is a section taken on the line 2a—2a of FIG. 2 through the screen strainer;

FIG. 3 is a plan view in partial perspective of a modification of the strainer showing means for lifting the strainer from the can;

FIG. 4 is a fragmentary section taken on the line 4—4 of FIG. 3, showing ears for holding a wire handle;

FIG. 5 is a view showing the arcuate wire handle;

FIG. 6 is a modification showing the application of a spout;

FIG. 7 is an elevation similar to FIG. 6 with parts in section;

FIG. 8 is a bottom plan view of the screen shown in FIG. 7;

FIG. 9 is a plan view of another modification of the can cover which is provided with a spout and rotatable vent disk;

FIG. 10 is a section through the rotating vent disk shown in FIG. 9, taken on the line 10—10;

FIG. 11 is a plan view of the dish of FIG. 10;

FIG. 12 is a plan view of a paint cover of a three-quarter size;

FIG. 13 is a plan view of a paint cover of a half size;

FIG. 14 is a sectional elevation through the center of a conventional paint can showing the relative position of the strainer in the can;

FIG. 15 is a plan view with a partial section taken on the line 15 —15 of the can in FIG. 14, indicating the relative position of the screen strainer in its relationship to the lip or the rim of the paint can; and FIG. 16 is a cross sectional view through the screen retainer showing an additional modification.

It is to be understood that the present form of disclosure is merely for the purpose of illustration; and that one may devise various modifications thereof, without departing from the spirit of the invention as herein set forth.

Referring now more particularly to the drawings, showing the paint can 10, and more particularly to FIG. 1, showing a can container, a quantity of pant 11, and the paint strainer 12, made in accordance with the present invention, the screen strainer 12 may fit freely into the interior 13 of the paint can 10 for the purpose intended. In accordance with FIG. 2, it can be discerned that the strainer 12 preferably may be formed out of a piece of wire screen cloth or mesh, cut in a circular contour, so as to resemble a disk. The outer edge of the screen, or its outer circumference may be turned over inwardly (not shown) to reinforce it. However, preferably there can be provided a reinforcing ring 14 having a U-shaped cross-section (see FIG. 2a). The reinforcing ring 14 may be mounted around the circular screen 15 and can be pressed tight to form a permanent fit. FIG. 2a, shows in section particularly the manner of mounting as above described. However, other ways of mounting are possible such as welding the reinforcing ring 14 to the screen. This design is designated as model (A) strainer.

FIGS. 1, 2 and 2a illustrate one form of screen strainer and its application to paint cans. However, other types are possible, as shown in FIG. 3, which may be designated as a model (B) strainer. FIG. 3 shows a screen similar to that in FIG. 2, however, with a number of improvements. In this latter case the screen may be provided with a pair of mounting ears 16, each having a hole 17. These ears at their lower ends 16a are U-shaped and can be made to fit snugly over the edge of the ring 14 of the screen 15. The ears 16 may extend vertically and at 90 degrees above the lower ends 16a, as shown in FIG. 4. FIG. 5 shows a swivel type arcuate wire handle 18 which may be provided at both extreme ends thereof with the short extensions 19. These may be inserted into the holes 17, in the ears 16, to complete the handle assembly. It is, of course, obvious, that the arcuate handle 18 is only an accessory to be used in connection with the wire screen strainer as an additional feature. The screen strainer above described may be used effectively without the handle 18.

Now referring more particularly to FIG. 6, which is a modification, the paint can 10 may be provided with an accessory cover 20a. The latter may be of similar manufacture and have an inner surface resembling conventional paint covers permitting mounting the cover into the opening in a can of conventional design. However, my cover 20a, additionally, may be provided with a built-in funnel which is an integral part of the cover, terminating in a handy spout 22. Also the exterior of the cover 20a may be provided with a stationary handle 23 to facilitate removal of the cover 20a from the can 10. The handle may be formed in the usual manner and substantially as indicated in FIG. 6 having a pair of handle extensions 23a which may be spotwelded onto the can cover at 23b. The end of the spout 24 may be provided with a threaded cap 25 as a safety feature to close the open end of the funnel 24 (see FIG. 6).

FIG. 7 is an enlarged view through the funnel 21 showing the manner of construction. It can be discerned that the lower section of the spout 22 is provided with a screen 26. In like manner as shown in FIG. 2a, the screen 26 can be provided with an arcuate reinforcing rim 26a which may be U-shaped in cross-section. The screen 26 may have a wire handle 28a permanently mounted upon a pair of ears 28, substantially as indicated in FIG. 8. The latter being a bottom plan view of the screen strainer shown in FIG. 7.

It can be readily discerned that the screen 26 is held under the spout 22 by means of turned-in mounting sections 28b which are formed in the cover 20a. The screen 26 is snapped into the turned-in sections 28b and is held through friction. However, it is possible to remove the screen 26 from the can cover 20a by pulling upon the wire handle 28a, by hand.

FIG. 7 shows the paint cover 20a removed or separated from the paint can. The lower portion of the funnel-shaped feature 21 in this case is provided with a rigid (not pliant) type strainer 26. As explained previously, the strainer 26 is friction fitted into a suitably formed groove in the cover. The rigid strainer 26 is so designed as to be removable from the grooved portion 28b. However, the funnel-shaped feature 21 may be used with or without the rigid strainer 26. It can be also discerned that the cover 20a, at its lower side is provided with a circular collar 27 which fits snugly into the opening in the can. The collar is a standard feature in all standard can covers.

The primary purpose of the funnel-type feature 21 and its spout 22 is to permit the painter to pour fresh paint from a full can without spilling it. The spout 22 will allow a most accurate pour. It is, of course, understood, that if the fresh paint is smooth running then the painter can proceed immediately with his work. However, should a cursory study of the paint in the can disclose that it has lumps, then the painter can insert the rigid type strainer 26 into its holding grooves or portions 28b as above described. When the painting work has been completed the strainer 26 can be removed for cleaning purposes and later returned to its original position. The rigid type strainer 26 can be removed, cleaned and washed, and re-used as many times as it is necessary. In FIG. 7, when the cover 20a is placed over the opening in the can 10, it can be discerned that the lip or the circular collar 27 (male member) may be positioned into the groove 29 (female member) of the can as shown in FIGS. 14 and 15.

FIG. 8 shows a bottom view in elevation of the rigid strainer 26 which has a swivel-wire-handle 28a which is similar in construction to the handle 18 in FIG. 5, but smaller. The primary purpose of the swivel wire handle is to facilitate the removal of the screen 26 from its groove or its holding sections 28b when it is required.

FIG. 9 illustrates another modification of a whole cover 20a with a handle 23. The latter may be provided with a pair of wire extensions 23aa which may be mounted in the ears 24bb substantially as indicated. The cover may be provided with a small aperture 30 to allow air into the can 10, so it will allow for a venting of air for free flow of the paint. In FIG. 9, the funnel 21, instead of being in line with the center of the cover 20a, is offset, and occupies one half of the cover, on one side of the handle 23, substantially as shown.

FIG. 10 is a section showing a small rotary disk 31 mounted on the cover 20a of FIG. 9 and which is provided with an aperture 30a which can be of the same diameter as the size of the opening or vent hole 30 in the cover 20a. The rotary plate 31 may also be provided with a small stationary stud pin 32 on which it is mounted to turn upon the cover 20a. The stud pin 32 is held in the hole which is drilled or punched into a cover 20a during the manufacturing process. The cover 31 may also be provided with a pair of finger detents or grips 34 so that it can be rotated with the fingers. FIG. 11 is a plan view of FIG. 10, showing additional details of the rotating disk 31.

Referring now more particularly to FIG. 12, the latter shows a paint can cover 20b of segmental configuration (i.e., with a perimeter consisting of an arc and a chord) and covering only ¾ of the area of the cover 20a; thus free space is left alongside the cover for venting the air and permitting the insertion of a stick to mix the paint in the can at it is being used up. FIG. 13 shows a half cover 20c of semicircular shape. In construction both the ¾ and the ½ covers are similar to that shown in FIG. 9, however, the covers in FIG. 12 and 13 are each provided with a greater free opening for venting of the paint can during pouring from a spout.

FIGS. 14 and 15 are cross sections indicating the relative position of the screen strainer mounted in the can 10. FIG. 14 shows the manner in which the strainer is placed inside the can over the lumps, and the manner in which the screen strainer is pushed down towards the bottom of the can to clean and to remove the lumps from the main volume of the paint. FIG. 15, shown partially in cross section, indicates the manner in which the screen strainer clears the opening in the can. The strainer only needs be slightly smaller in diameter than the opening in the can formed by its circular grooved lip 29, substantially as indicated.

It may be noted that the handle 18, in FIG. 5, may be also provided with a suitable cord or a flexible chain "F". By means of the loop "G" one end of the cord "F" is secured to the handle 18, while at its other end "D" it is attached to a plastic or metal ring "E", shown in dotted lines. Cord "F" will facilitate the easy removal of the paint strainer from the can. Cord "F" can be of suitable length so that it will lap over the exterior of the lid of the paint can 10.

It is, of course, understood that the outer diameter of the screen strainer for best results should be as nearly of the same diameter as the inside of the paint can. However, in such case it would be very hard to insert a rigid strainer into the can considering the fact that the diameter of the opening in the can is substantially smaller than the diameter of the inside of the can. (The smaller opening in the can provides a U-shaped seat into which the can cover is wedged.) To permit easy insertion of the screen strainer into the can 10, the screen at its reinforcing ring can be made of thin and pliable material. The screen strainer need not be formed of heavy duty wire mesh and the retainer ring can be made of light gage tin. Thus, to improve the overall design one may provide also a pliable reinforcing ring 14a (FIG. 16) preferably made of rubber, having a thinner annular extension 14b. The reinforcing ring 14a is anchored around the screen 15 in similar fashion to the reinforcing ring 14 in FIG. 4. The modified paint strainer shown in FIG. 16 has an outer diameter approximately of the same, or slightly smaller diameter than the inner diameter of the paint can 10. In other words when the modified strainer in FIG. 16 is placed inside the paint can, its rubber annular ring 14b contacts the inner wall of the can 10 so as to provide a seal to prevent leakage. Thus the free flowing paint is forced to pass through the screen mesh in the strainer and not outside of its ring 14b. Due to the fact that the strainer shown in FIG. 16 is flexible and its modified rubber annular ring is also flexible, therefore, it easily yields to pressure and bends. The modified strainer can be forced into the paint can by hand, then through the use of the stick the strainer is forced to the bottom as already described. After the modified strainer is placed in the can it will restore itself to its original flat, round shape.

Minor changes in shape, size, materials and rearrangement of parts may be resorted to in actual practice, as long as no departure is made from the invention.

Having described my invention, what I claim is the following:

1. A paint can fitment for separating lumps of coagulated paint from free flowing paint comprising a screen strainer, said screen having an arcuate circumference, a means for reinforcing the arcuate circumference of said screen and comprising an arcuate reinforcing section, said section being a separate member; and a pair of ears mounted in substantially opposite disposition upon said section, each of said ears having an opening in substantial alignment with the opening in the opposite ear, and a handle having a pair of bent extensions, with each said extension inserted in an opening in one of the aforesaid ears, whereby said strainer is adapted for sliding and substantially sealing engagement with the interior curved wall of a conventional paint can and for permitting said strainer to be pressed down through paint in said can to filter said paint by holding lumps of coagulated paint beneath said strainer, thereby permitting utilization of the filtered paint above said strainer.

2. A paint can fitment according to claim 1 wherein said arcuate reinforcing section is a ring having said ears mounted oppositely and peripherally thereon, and said handle is an arcuate wire handle with said bent extensions thereof substantially normal to the arc of said handle, whereby said handle is adapted for moving said strainer through paint in a conventional can.

* * * * *